June 6, 1950 — E. V. FLAHERTY — 2,510,566
ARTIFICIAL FISHING BAIT
Filed Jan. 10, 1946
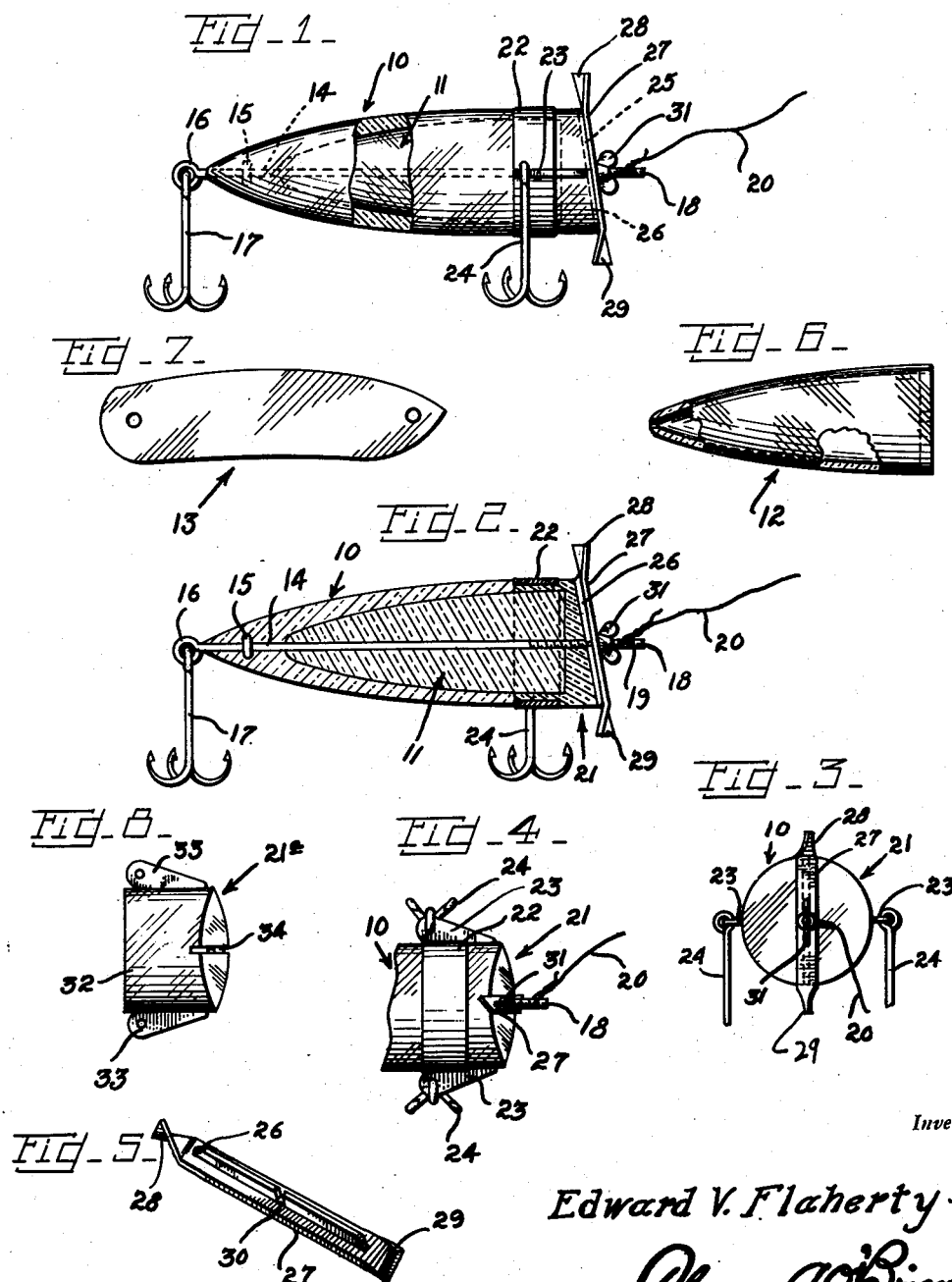
Inventor
Edward V. Flaherty
By Clarence A. O'Brien
and Harvey B. Jacobson
Attorneys Patented June 6, 1950

2,510,566

UNITED STATES PATENT OFFICE 2,510,566

ARTIFICIAL FISHING BAIT

Edward V. Flaherty, Woonsocket, R. I.

Application January 10, 1946, Serial No. 640,320

3 Claims. (Cl. 43—42.09)

The present invention relates to plug type fishing lures, artificial baits and the like and has more specific reference to an article in this category which is possessed of appreciable refinements and structural distinctions, adequate, it is believed, to better serve the purposes of anglers whether used as a surface or an under-surface bait.

Needless to say, I am sufficiently conversant with the state of the prior art to realize that countless different forms and types of artificial baits have been offered as novel contributions to this field of endeavor. It follows, therefore, that the present invention appertains to what is thought to be a distinguishable contribution in that it has primarily to do with an artificial bait whose body is in the form of a transparent, suitably-shaped shell functioning as a container for an insertable and removable core and said core being in the form either of a bright-surfaced spoon or a colored plug visible through the shell in a manner to produce a highly attractive lure.

Another object of the invention is to provide a lure of the afore-mentioned style and character which is further provided on its line attached end with detachable and interchangeable fins.

Another object has to do with the provision of a detachable strip carrying fins at opposite ends and to further provide, inwardly of such strip a bank-like collar, this having side wings serving as rudders as well as anchoring members for multiple-pronged hooks which are attached thereto.

Another object of the invention is to provide an artificial lure along the afore-mentioned lines, the same being comparatively simple, easy to handle by fishermen and others in other lines devised to fulfill the requirements of an accessory of this type.

Other objects, features, and advantages will become more readily apparent in the following description and the accompanying illustrative drawings.

In the drawings, wherein like numerals are employed to designate like parts throughout the various views:

Figure 1 is a side view, essentially in elevation, with a part broken away and shown in section, of an artificial bait or lure constructed in accordance with the principles of the present invention;

Figure 2 is a central longitudinal sectional view through the same;

Figure 3 is a front end elevation, that is, a view based on Figure 1 observing same in a direction from right to left;

Figure 4 is a fragmentary top plan view of the outer or front end of said bait;

Figure 5 is a perspective view of a part provided with the twisted end-fins;

Figure 6 is a view, in elevation and section, of an insert, this being one of the color-change elements;

Figure 7 is a detailed view of a spoon such as is sometimes used instead of the insert seen in Figure 6; and, Figure 8 is a detail plan view of a cap-like head, showing a modified form in which a ferrule-like band, a separate element, is eliminated, the entire head being of one-piece construction.

Referring now to the drawings (Figures 1 to 4) by distinguishing reference numerals it will be seen that the body proper is denoted by the numeral 10 and is in the form of a hollow tapered somewhat conical-shaped shell. This part is made of Plexiglass, Lucite or a similar transparent molded plastic product. It is open at the right-hand end and thus provides a container for reception of optionally applicable and removable inserts.

Different types of inserts are employable in conjunction with the body 10. For example, in Figures 1 and 2 I show a solid plug-like conical insert or core denoted by the numeral 11. In Figure 6, I show a correspondingly-shaped insert 12 but this is preferably hollow. These solid and hollow conical inserts 11 and 12 are of suitable plastic or other materials and are shaped to fit snugly in the pocket or socket provided in the shell 10 as shown in Figures 1 and 2. These inserts are suitably colored and since the shell portion of body 10 is transparent, the color shows through and thus provides the different color changes and effects. Instead of employing colored inserts 11 and 12, and if it is desired to obtain a somewhat scintillating effect, this can be had through the use of a highly polished light reflecting spoon or spinner 13, (not claimed) such as is shown in Figure 7.

A rod 14 is provided and this is anchored at one end, as at 15, in the tail portion of the body.

The adjacent left-hand end is extended beyond said body formed into an eye 16 which serves as an accommodation for the multiple-pronged fish hook 17. The right-hand end of the rod extends well beyond the open end of the body or shell where it is threaded as at 18 and also provided with a slot 19. Said slot serves to accommodate the adjacent attached end of the fishing line 20.

By slipping the core or insert 11 about the rod 14 it becomes "pocketed" in the socket portion of the body, as is obvious. However, a more complete assemblage and retaining result is afforded by the adoption and use of a closing cap 21. This cap telescopes and fits over the threaded end of the rod, also over the adjacent end of the plug-like colored insert 11 and abuts the adjacent end of the shell 10. The abutting end is reduced and this reduced end portion is surrounded by a metal or equivalent band 22 which we can refer to as a collar. This collar is provided on diametrically opposite sides with outstanding wing-like flanges 23 which serve as balancing vanes. These vanes also function as suspension elements for fishing hooks 24. The flat disk-like central portion of the cap is apertured to permit protrusion of the threaded end portion of the rod. Said central portion is also provided with a groove serving as a key-way 25 for a keying rib 26 on a metal double finned strip 27. This strip fits firmly against the slanting disk-like end of the cap with the rib 26 fitting into the key-way. The end portions of the strip are twisted in opposite directions and suitably shaped as at 28 and 29 to provide the fins. It is my desire to use different types of fins or fin-equipped strips to obtain different actions and results in the water as the device is pulled and drawn through the water. The strip 27 is provided with a central aperture as at 30 and the threaded end 18 of the rod projects through said aperture and a wing-nut 31 is applied on the rod to hold the fin-strip in place and also to clamp the cap firmly over the plug 11 and against the adjacent end of the shell 10. This will be clear by comparing Figures 1, 2 and 5.

A lure or bait of the type herein shown and described permits the angler to change its color at will and also allows him to use it as a surface or under-surface bait, and the provision of the side rudders and front fins on the cap-like head facilitates handling by the angler and changing of the action of the bait in the water. However, it is not the purpose of the instant disclosure to attempt to comprehend all of the various actions and facilities of an article in this category since they will best be understood by fishermen and anglers and those in a position to appreciate, as a result of experience, the many possibilities attending a bait as herein shown and described.

Reference is now directed to the fact that in the main figures, for example Figures 1, 2 and 4, the so-called cap-like head 21 is shown as provided with a reduced inner end and this is surrounded by a special band 22 carrying the rudder like vanes or fins 23. It is not always necessary to use a composite construction as regards this phase of the construction. Attention is therefore directed to Figure 8 which it will be seen that the cap-like head is denoted by the numeral 21a and this is all of one piece of plastic or equivalent material, the same including a cup or cap-like portion 22 with diametrically outstanding fin-like rudders 33. The outer end of the head is provided with a kerf or groove 34 which forms a keyway to accommodate the key 26 on the aforementioned strip 27. I desire the claims to be construed to cover either the band 22 or the arrangement of head construction shown in Figure 8 wherein said band is eliminated.

Changes in shape, size, materials and rearrangement of details and parts may be resorted to in actual practice, so long as they do not depart from the spirit of the invention or the scope of the appended claims, as is well understood.

I claim:

1. An artificial bait of the kind shown and described comprising a one-piece hollow transparent body closed at one end, open at the opposite end and providing a core containing socket, the interior wall portions of said socket being completely smooth surfaced and wholly free of obstructive projections, an insertable and removable rigid smooth-surfaced core plugged into and completely filling said socket, said core being colored and clearly visible by way of the transparent socket walls, one end of said core projecting through and beyond the open end of said socket, a closing gap fitted telescopically over the projecting end of said core and abutting the adjacent end of said body, a rigid rod embedded and securely anchored at one end in the closed end of said body and extending axially through said core and through and beyond said cap, the extending end portion of said rod being screw-threaded, said cap being exteriorly grooved and providing a keyway, a substantially flat and narrow strip member contacting said cap and having a keying rib keyed in said keyway, said member being of a length greater than the diameter of said cap and having its ends projecting beyond the periphery of the rim of said cap, said ends being axially twisted to provide fins, the screw-threaded end of said rod piercing and extending through said strip member, and a nut on the screw-threaded terminal of said rod clamping said strip member, cap and core in place relative to said body and socket.

2. The structure specified in claim 18 wherein the rim of said cap is provided with diametrically opposite outstanding vanes, said vanes being at right angles to the longitudinal axis of said strip member, whereby the respective vanes and fins are at equi-distant circumferentially spaced points in relation to the cap and body.

3. An artificial bait of the kind shown and described comprising a substantially conical one-piece hollow transparent body closed at one end, open at the opposite end and providing a core containing socket, said socket being substantially conical and the interior wall portions thereof being completely smooth surfaced and wholly free of obstructive projections, a correspondingly conical insertable and removable rigid smooth-surfaced core plugged into and completely filling said socket, said core being covered and clearly visible by way of the transparent wall portions of said socket, a closing and head forming cap having a disk-like body portion and a surrounding rim portion, said rim portion abutting the adjacent end of said body, said disk-like portion being exteriorly grooved to provide a keyway, said rim portion being provided with outstanding flanges constituting vanes and said flanges being at diametrically opposite points, fishhooks attached to said vanes, a relatively narrow and flat strip member residing in contact with the disk-like portion of said cap and being provided on its inward side with a keying rib keyed in said keyway, said strip member being of a length greater than the diameter of said cap and having its end projecting beyond the periphery of the rim of said cap, said ends being axially twisted to provide fins, a rod member having a hook eye at one end and having its opposite end screw-threaded, the eye equipped end of said rod being embedded and anchored in the closed end of said body with the eye projecting beyond said closed end to accommodate a fishing hook, the intermediate and opposite end portion of said rod extending axially through and beyond said core, through the disk-like portion of the cap and through the central portion of the strip-like member, the threaded terminal portion projecting beyond said strip-like member, and a thumb nut screwed on said screw-threaded terminal and serving to assemble and clamp the strip-like member, cap, and core in place in respect to said body and socket.

EDWARD V. FLAHERTY.

REFERENCES CITED

The following references are of record in the file of this patent:

UNITED STATES PATENTS

| Number | Name | Date |
|---|---|---|
| 1,233,507 | Reynolds | July 17, 1917 |
| 1,740,335 | Cowan | Dec. 17, 1929 |
| 1,833,241 | Wright | Nov. 24, 1931 |
| 1,900,339 | Harrell | Mar. 7, 1933 |
| 2,008,437 | DeWitt | July 16, 1935 |
| 2,078,816 | Shenitz | Apr. 27, 1937 |
| 2,112,385 | Smith | Mar. 29, 1938 |
| 2,127,761 | Beck | Aug. 23, 1938 |
| 2,190,791 | Larson | Feb. 20, 1940 |
| 2,309,521 | Mabee | Jan. 26, 1943 |

FOREIGN PATENTS

| Number | Country | Date |
|---|---|---|
| 365,377 | Great Britain | Jan. 21, 1932 |